United States Patent [19]

Dumbeck

[11] 4,275,711
[45] Jun. 30, 1981

[54] SOLAR ENERGY COLLECTOR SYSTEM

[76] Inventor: Robert F. Dumbeck, FM 3000, Box 548, Elgin, Tex. 78621

[21] Appl. No.: 39,551

[22] Filed: May 16, 1979

[51] Int. Cl.³ .............................................. F24J 3/02
[52] U.S. Cl. ................................. 126/425; 126/438; 350/61
[58] Field of Search ............... 126/424, 425, 426, 438, 126/439, 900, 417, 418, 449, 450; 353/3; 15/256.5; 159/1 W, 15, DIG. 15; 202/234, 239; 350/61

[56] References Cited

U.S. PATENT DOCUMENTS

| | | | |
|---|---|---|---|
| 1,543,411 | 6/1925 | Wittig | 15/256.5 |
| 2,809,815 | 10/1957 | Born | 15/256.5 |
| 3,841,738 | 10/1974 | Caplan | 126/438 |
| 4,056,309 | 11/1977 | Harbison | 350/61 |
| 4,074,705 | 2/1978 | Robinson | 126/900 |
| 4,077,392 | 3/1978 | Garner | 126/438 |
| 4,092,979 | 6/1978 | Kotlary | 126/438 |
| 4,153,039 | 5/1979 | Carroll | 126/424 |
| 4,156,420 | 5/1979 | Gunderson | 126/438 |
| 4,170,985 | 10/1979 | Authier | 126/438 |
| 4,194,492 | 3/1980 | Tremblay | 126/438 |

Primary Examiner—Herbert F. Ross
Attorney, Agent, or Firm—Laurence R. Brown

[57] ABSTRACT

The invention comprises efficient means for conversion of solar energy into stored heat by means of a circulating fluid, preferably silicone oil, so that temperatures higher than 100° C. may be efficiently attained. The fluid is passed through a helical conduit pipe of a blackened metal such as anodized aluminum or copper upon which a stainless steel semi-cylindrical reflector surface concentrates solar energy. There is a movable cleaning rig with a silicone oil wetted pad array that passes periodically over the stainless steel surface to keep it free of dirt and film. Also the transparent cover of a compartment in which the collector is mounted is periodically cleaned. Preferably the collector array is mounted in a pit in the ground to retain ground heat and prevent convection and radiation losses, and the reflector is moved to track the sun position.

18 Claims, 8 Drawing Figures

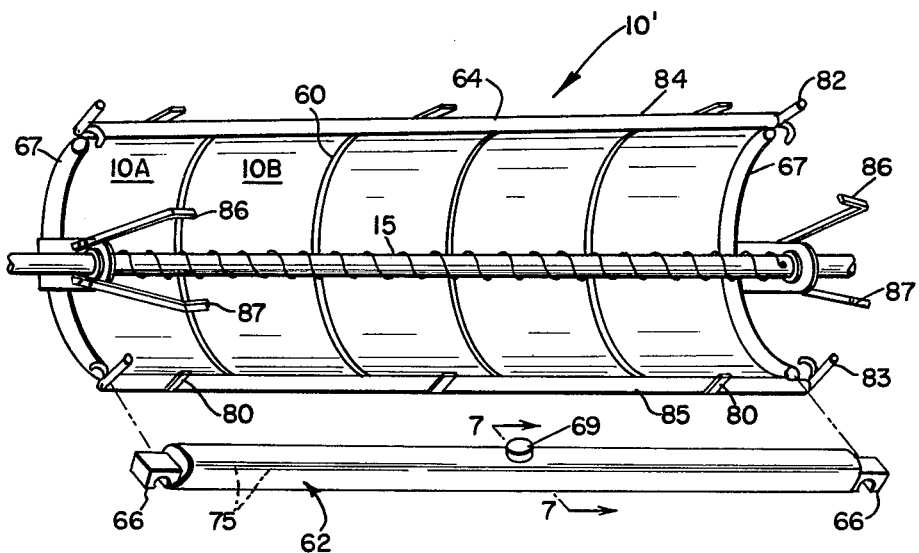
Fig. 6
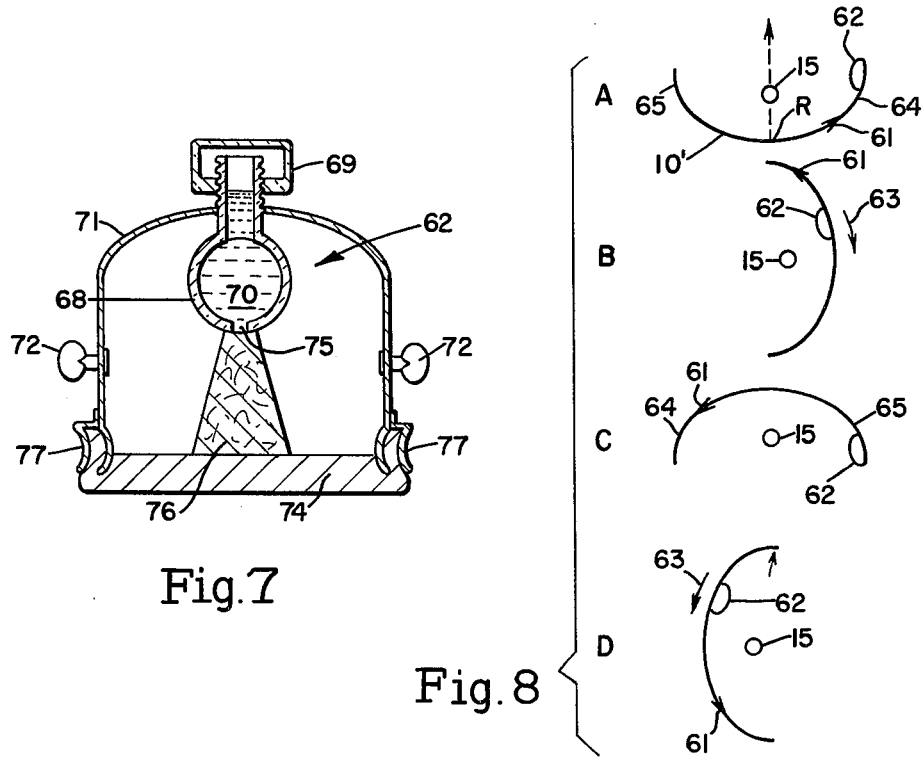
Fig. 7
Fig. 8

SOLAR ENERGY COLLECTOR SYSTEM

TECHNICAL FIELD

This invention relates to solar energy conversion and more particularly it relates to solar energy collectors for concentrating solar energy on a working fluid to heat it and the system surrounding the collector.

BACKGROUND ART

While many solar energy collectors have been proposed in the prior art, most have been deficient in working efficiently over long periods of time, and have required extensive maintenance. In most cases the collectors have been expensive, and have been restricted to use in limited applications.

Concave reflector type collectors have been well known and these are adaptable for use with servo systems that track the sun as shown for example in U.S. Pat. No. 4,038,971 issued Aug. 2, 1977 or U.S. Pat. No. 4,061,130 issued Dec. 6, 1977. It is desirable for optimum efficiency to direct solar energy collectors toward the sun and to track the sun to receive the maximum solar energy into the collector.

A serious problem with efficiency and longevity of use of solar collectors between maintenance periods is to keep reflector surfaces and transparent windows clean and free of interfering films and dirt. It has been proposed that solar collectors be self-cleaning by means of running water in U.S. Pat. No. 3,785,931 issued Jan. 15, 1974. It is not feasible, however, to provide running water to cleanse the surfaces in most practical operation conditions, and further the water itself carries substances that make films and decrease reflectivity.

In order to increase efficiencies in solar furnaces which concentrate solar rays upon a pipe carrying liquids to be heated, it is known that the effective heat absorbing area of the pipe can be increased with fins or the like as shown in U.S. Pat. No. 4,092,979 issued June 6, 1978. Also in this and other patents blackened pipe surfaces have been used for more efficient heat absorption to prevent reflection off the pipe and loss of the available heat.

It is the object of this invention to improve the state of this solar energy collector art by providing inexpensive and efficient solar energy collection means in an improved combination of elements coacting together to utilize solar energy.

Other more specific objectives of the invention are to (1) collect rays and transport materials heated by the rays at temperatures greater than 100° C.; (2) to avoid losses inherent in most collectors because of reradiation and convection losses from wind and reflection, etc.; (3) to provide means for keeping the reflective surfaces clean avoiding accumulation of films and dirt which reduce solar energy conversion efficiencies; (4) to provide a substantially maintenance free system that retains its conversion efficiencies over long time periods; (5) to improve collection efficiencies; and (6) to keep construction simple and inexpensive using low cost common materials and manufacturing techniques.

BRIEF DESCRIPTION OF INVENTION

A solar energy collection system uses an inexpensive universal collector comprising a reflective surface concentrating solar energy on a helical conduit pipe of black anodized aluminum or the like within which silicone oil solar energy storage fluid is heated to a temperature greater than 100° C. The reflector is of stainless steel and is cleaned by a periodically movable rig containing a pad wetted with silicone oil to prevent accumulation of films and dirt that reduce efficiency. The array is mounted in a pit in the ground to retain ground heat and avoid convection currents thereby improving operational efficiency. A transparent cover of plastic film for example is rotated for cleaning so that it does not accumulate film or dirt to decrease the collection efficiency.

BRIEF DESCRIPTION OF DRAWINGS

FIG. 6 is an exploded perspective view of a self cleaning solar collector;

FIG. 7 is section view of the cleaner pad as taken along lines 7—7 in FIG. 6; and FIG. 8 is a sequence diagram of a rotating self cleaning solar collector arrangement afforded by this invention.

DETAILED DESCRIPTION OF PREFERRED MODES OF THE INVENTION

Figure 1:
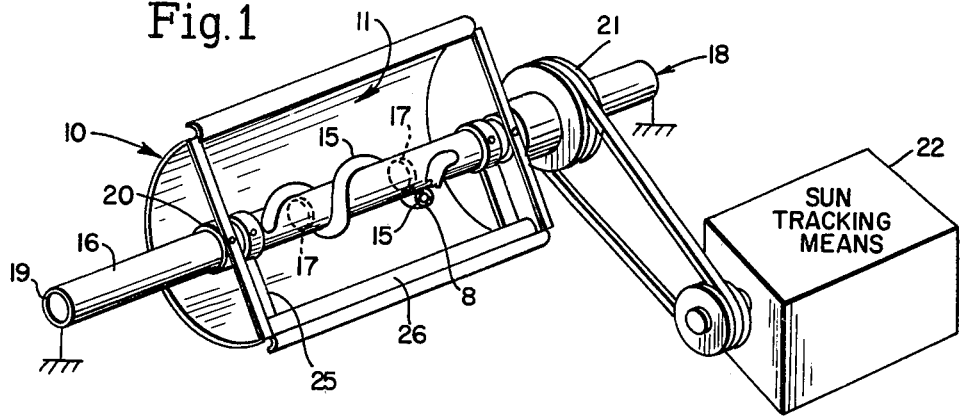
FIG. 1 is a perspective sketch, partly in section, of one embodiment of the universal solar collector array afforded by the invention.

With reference to the drawing it may be seen that a semi-cylindrical reflector 10 has an inside surface 11 arranged to concentrate collected solar energy upon a coiled helical conduit pipe 15 connected in this embodiment through a mounting pipe 16 to pass fluid from one end to the other. Thus, barriers 17 are provided so that flow for example of cooler liquid into end 18 will pass through helical conduit 15 arranged to receive concentrated solar energy and become heated to pass out end 19 at a higher temperature.

The grounding symbols denote some mounting array not shown holding the pipe 15 in a clamped position so that the reflector 10 can rotate about it on bearings 20. A pulley 21 is arranged so that the reflector can be rotated from east to west to track the sun by tracking means 22. Such tracking means are well known in the art.

Figure 2:
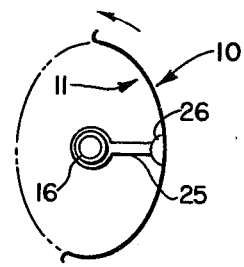
FIG. 2 is a diagrammatic end view of the collector array with the reflector surface revolving about a cleaning pad.

Fixed on mounting pipe 16 in a stationary position is the cleaning rig 25 which has a pad 26 engaging the reflecting surface 11 to clean it as the reflecting surface rotates about pipe 16. Thus the reflector surface is automatically cleaned periodically when the tracking means 22 rotates the reflector 10 as seen diagrammatically in FIG. 2.

The reflector surface is preferably stainless steel and the pad 26 is then wetted with silicone oil, which serves as an efficient cleaner to keep the surface free of film and dirt and polished for good reflection efficiency of the solar energy.

The helical pipe 15 (shown for clarity in exaggerated pitch) has a tightly coiled helix wound about pipe 19 which preferably constitutes an insulating plastic pipe to convey heated fluid without radiation losses. The helix is blackened and made preferably of anodized aluminum or treated copper which can be cheaply manufactured and formed and which thereby efficiently heats the liquid flowing therethrough with the concentrated solar energy and reduces radiation losses and reflected energy which would be ineffective in solar energy conversion to stored heat in the carrier liquid.

Figure 3:
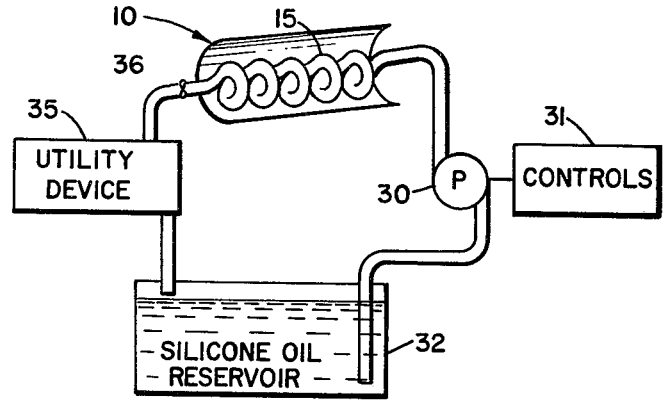
FIG. 3 is a perspective view of a simple collector array in an efficient high temperature solar energy storage system afforded by this invention shown in block diagram form.

Preferably the carrier storage liquid is silicone oil as shown in FIG. 3. This permits temperatures in excess of 100° C. to be attained in an open non-pressurized system. That is not feasible with water which would turn to steam and reduce efficiency above the 100° temperature range.

Thus the pump 30 by appropriate controls passes silicone oil that may be obtained from the reservoir 32 through the helical conduit pipe array 15 for heating reflector 10. The conduit pipe 15 size and flow rate may be controlled to achieve the desired temperature of 100° C., above or below. The stored heat is then carried by the fluid through the utility device 35 and or bypassed to the storage reservoir 32.

It is noted that a simpler solar collector array is shown in FIG. 3 and comprises simply a stainless steel elongated conical array 10, suitably mounted by means not shown to collect and concentrate solar energy upon a length of helical conduit pipe, suitably connected at joints 36 to the other solar heating system components. It is significant that this collector construction is inexpensive, efficient and universally usable in many different locations and environments. Because of the long fluid path provided by the helical conduit pipe 15, the efficiency of heating is improved and higher temperatures may be attained with smaller reflectors and collector unit size.

The system has the collector array 10–15 mounted in a closed insulated compartment for better efficiency, thereby to retain without losses by convection and radiation, more of the collected solar energy for greater efficiency, and to normalize operation over different seasons. For example, operation in the ambient temperature in winter at 0° C. with wind blowing across the collector pipe will be quite inefficient because of convection losses. Also significant radiation losses occur if the collector is not confined so that there is less reradiation from the pipes and reflectors outside the heat collecting system.

Figure 4:
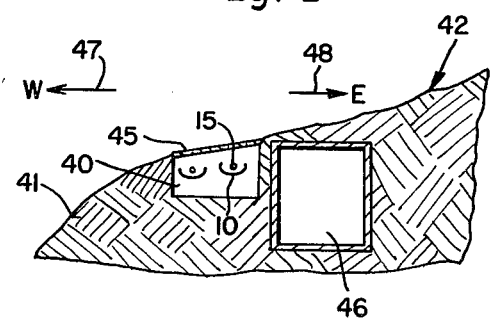
FIG. 4 is a section view of a pit in the side of a hill protecting the collector array from loss of available solar energy by convection and radiation.

Thus as shown in FIG. 4, the preferable mode of operation is to use a confining compartment 40, which is a pit in the earth 41 as shown by the section through the side of a hill 42, for example. This compartment is closed by a transparent cover 45 which will be seen more readily in the diagrammatic view of FIG. 5 in a preferred embodiment. The collector is mounted adjacent an underground storage tank 46, for example. Thus the earth retains a substantially constant temperature, is an insulator, prevents convection and radiation and keep summer-winter operating conditions relatively consistent for simpler more effective system engineering. Preferably the direction of the compartment pit 40 is north and south so that the cylindrical reflectors can track the sun from morning to evening as aforementioned. The arrows 47, 48 signify this.

The pit cover preferably has a movable transparent film belt 45' carried over rollers 50, 51 as driven by motor 52, or other means such as a hand crank. This array, if a small motor runs continuously at a low rotational speed, permits the film to be cleaned by pads 53, 54 and thus the solar energy collection efficiency is not impaired by the usual film and dirt collection upon compartment covers. Note also that the double thin film thickness 56–57 with an air gap 58 therebetween serves as an efficient insulated means of transmitting solar rays while retaining ambient heat within the compartment 40 at a temperature above the outside ambient temperature, thereby reducing losses and improving operating efficiency.

Thus, when solar energy is processed either by the collector surface or the transparent cover this invention provides periodically operated means for keeping those surfaces clean and efficient.

The collector helical pipe array is made by pulling a clear plastic sleeve 8 such as "Teflon ®" closely over a black anodized aluminum tubing 15 and spiral winding with a turning lathe over an aluminum mandrel tube. The plastic sleeve is important in preventing losses from the collector pipe as an insulator and as means protecting the collector pipe from convection losses.

Figure 5:
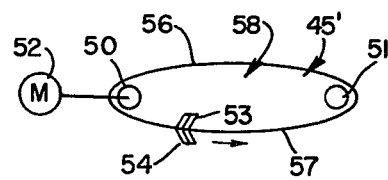
FIG. 5 is a diagrammatic view of a self cleaning transparent cover for a collector compartment.

A detailed arrangement of the collector cleaner array afforded by this invention to improve the operational efficiency of the collector is illustrated by FIGS. 5 to 7.

The collector 10 of FIG. 5 has five sections 10A, 10B, etc. of (18 mil) 0.457 mm thick stainless steel sheets (four feet) 1.2 meters wide slid into aluminum extrusions 60 serving as a framework. The stainless steel sheets 10A, etc. are preferably chromium plated.

As may be seen from FIG. 8, for proper focussing the conduit pipe 15 is mounted at half the radius R of the collector semi-cylinder 10'. The arrow 61 indicates that the collector turns counterclockwise scanning from east to west to track the sun, and one complete rotation is made each 24 hour day.

Thus FIG. 8A may represent midday position, FIG. 8B dust position, FIG. 8C midnight position and FIG. 8D dawn position of rotation about the conduit pipe 15, as for example driven by a motor and pully illustrated in FIG. 1. In this preferred embodiment of FIGS. 6 to 8 however the cleaner pad 62 is operated by force of gravity to pass over the collector surface twice a day as represented by arrows 63. Thus in the daytime, the cleaning pad 62 is latched in place at one end 64 of the collector arc and at nighttime at the other end 65. At dusk and dawn as the collector shell 10' rotates into a substantially vertical position then the cleaning pad is unlatched to move to the opposite end by force of gravity and thereby to clean off and polish the collector surface twice a day.

The cleaning pad assembly 62 has a rider 66 fitting on a guide rail 67 at each end of the collector shell 10', to thereby hold it in firm cleaning contact with the reflector surface as the shell rotates. The cleaning pad assembly 62 has a tank 68 of plastic or metal with a visible see through cap 69 for checking the level of silicone oil 70 thereinside. The casing 71 has a set of latch bars 72 extending from opposite sides and contains a wick 76 absorbing and wetted with the silicone oil and with a shoe section of soft padding 74 wetted with silicone oil that wipes against the collector surface. The tank is perforated at 75 to feed silicone into the wick to keep the assembly wetted and preferably a wick material section 76 conveys the silicone oil directly toward the shoe padding 74 to keep it wetted. The shoe section is replaceably clamped into place for example by clamps 77.

The latch bars 72 are retained at each end of the collector arc 64 and 65 by means of rotatably mounted latching hooks 80 held in either one of two detented positions, open or closed to receive or lock in place respectively the latch for 72 of the cleaning pad assembly. Latch levers 82, 83 on the corresponding rotating latch hook assembly 84, 85 will contact fixed radially located actuating arms 86, 87 as the shell 10' rotates to respectively latch and unlatch the cleaning bar assembly 62 for the cyclic operation of FIG. 8.

Accordingly it is evident that the solar energy losses from dirt and film collection on solar collector and energy transmission surfaces are by this invention reduced significantly by a mechanism that operates automatically and keeps the collection of solar energy at maximum efficiency.

Having therefore advanced the state of the art those features believed descriptive of the spirit and scope of the invention are defined with particularity in the following claims.

Industrial Applicability

This invention provides collection apparatus for collecting and storage of solar energy in a circulating fluid storage medium at high temperatures and efficiencies. The collection apparatus is low in cost and adaptable to use under various conditions in solar heating systems. The preferred embodiment uses silicone oil storage medium and periodically operated movable cleaning rig for removing film and dirt from a cylindrical solar reflector surface of stainless steel which concentrates solar energy on a black anodized aluminum helical fluid conduit pipe. Also the collector is mounted in a compartment having a transparent film cover movable through cleaning means to keep it from gathering dirt or film.

I claim:

1. Solar energy collection means comprising in combination, a fixed position conduit pipe in the form of a helix longitudinally disposed along an axis and adapted for conveying liquids to be heated by solar energy in a single direction along said longitudinal axis, and a reflector arranged axially along a helical array to receive and direct upon the helix over an axial distance therealong solar energy and means adapted to move the reflector relative to the helix to concentrate solar energy on the pipe throughout the day as the sun position changes, the reflector comprises a semi-cylindrical reflection surface relatively rotatable about its axis with a fixed position circumferentially disposed cleaning member engaging the reflector surface to wipe the reflection surface when it rotates.

2. The means defined in claim 1 wherein the conduit pipe extends axially away from the reflector at opposite ends.

3. The means defined in claim 1 in a housing comprising a closed top pit surrounded by earth and in temperature exchange relationship therewith to maintain in said pit an ambient temperature established by the earth temperature, with said reflector located therein to reduce convection currents and wind which would reduce the effective energy heating liquid in said pipe, thereby to retain the ground heat and earth insulation about the collection means.

4. The means defined in claim 1 wherein the helical array is wrapped around and disposed on the surface of an axial mounting member arranged axially along the axis of said reflector, and the reflector is held in place for rotation on said mounting member.

5. The means defined in claim 6 wherein the cleaning member comprises a pad wetted with silicone oil.

6. The means defined in claim 1 including means rotating said reflector about its axis to track the position of the sun during daylight hours, thereby periodically cleaning the reflector surface.

7. The means defined in claim 1 having a cleaning member mounted to move relatively over the reflector surface.

8. The means defined in claim 1 wherein the helical array comprises a blackened pipe covered by a transparent plastic cylindrical sleeve adjacent the pipe.

9. The means defined in claim 1 having the reflector and pipe mounted within a closed underground pit compartment preventing convection of air from carrying away solar energy from the vicinity of the conduit pipe.

10. The means defined in claim 1 mounted in a closed compartment covered with a transparent member and means movable across the transparent member surface to clean it.

11. The means defined in claim 10 wherein the transparent surface comprises a thin flexible plastic film in the form of an endless belt and means moves the belt through a cleaning member.

12. A solar energy collector array comprising in combination a reflector surface for concentrating solar energy rays, energy storage means positionable to receive the concentrated rays and a cleaning rig mounted adjacent said surface and movable over the reflector surface to remove dirt and film therefrom.

13. The array defined in claim 12 including means automatically moving the rig periodically over said surface.

14. The method of operating the solar energy collector of claim 1 by moving a reflector concentrating solar energy on the heat storage medium in a pit in the ground that preserves ground heat and reduces losses about the reflector from convection and radiation.

15. The method of operating solar energy collector array of claim 1 presenting at least one solar energy processing member comprising the step of periodically relatively moving cleaning means along solar energy processing member to prevent accumulation of film and dirt.

16. The method defined in claim 15 wherein the energy processing member is a solar collector and reflector surface including the more specific step of moving the reflector surface relative to the cleaning means by moving the reflector surface to track the sun.

17. The method defined in claim 15 wherein the energy processing member is a transparent cover over a compartment housing the collector array including the more specific step of moving the transparent cover continuously through said cleaning means.

18. The method of claim 15 wherein the processing member is a reflective solar collector, including the more detailed step of moving the cleaning means by changing the position of said collector to cause the cleaning means to move relative thereto by force of gravity.

* * * * *